(12) United States Patent
Klein et al.

(10) Patent No.: US 10,136,454 B2
(45) Date of Patent: Nov. 20, 2018

(54) APPLICATION SERVER FOR MANAGING COMMUNICATIONS TOWARDS A SET OF USER ENTITIES

(75) Inventors: Andreas Klein, Bonn (DE); Rainer Bremer, Sankt Augustin (DE); Sabine Demel, Vienna (AT); Thomas Dennert, Troisdorf (DE); Jens Nilsson, Niederkassel (DE); Jörg Thelen, Bad Honnef (DE)

(73) Assignee: Deutsche Telekom AG, Bonn (DE)

( * ) Notice: Subject to any disclaimer, the term of this patent is extended or adjusted under 35 U.S.C. 154(b) by 115 days.

(21) Appl. No.: 13/816,593

(22) PCT Filed: Aug. 10, 2011

(86) PCT No.: PCT/EP2011/063769
§ 371 (c)(1),
(2), (4) Date: Apr. 26, 2013

(87) PCT Pub. No.: WO2012/020052
PCT Pub. Date: Feb. 16, 2012

(65) Prior Publication Data
US 2013/0208676 A1    Aug. 15, 2013

(30) Foreign Application Priority Data
Aug. 12, 2010   (EP) .................................... 10172604

(51) Int. Cl.
*H04W 76/02*    (2009.01)
*H04L 29/06*    (2006.01)
*H04W 76/11*    (2018.01)

(52) U.S. Cl.
CPC ......... *H04W 76/021* (2013.01); *H04L 65/104* (2013.01); *H04L 65/1006* (2013.01);
(Continued)

(58) Field of Classification Search
None
See application file for complete search history.

(56) References Cited

U.S. PATENT DOCUMENTS

| 5,907,544 A | 5/1999 | Rypinski |
|---|---|---|
| 7,239,864 B2 | 7/2007 | Zhang |

(Continued)

FOREIGN PATENT DOCUMENTS

| CN | 101132405 | 2/2008 |
|---|---|---|
| CN | 101433036 | 5/2009 |

(Continued)

OTHER PUBLICATIONS

International Search Report for PCT/EP2011/063769, Completed by the European Patent Office dated Aug. 29, 2011, 2 Pages.
(Continued)

*Primary Examiner* — Steve R Young
(74) *Attorney, Agent, or Firm* — Brooks Kushman P.C.

(57) ABSTRACT

An application server for managing communications towards a set of user entities, the set of user entities having a first user entity. The application server includes a receiver for receiving a first session initiation request, the first session initiation request having a public identification identifying the set of user entities, a processor for assigning a first user identification to the public identification, the user identification identifying the first user entity, and a transmitter for transmitting a second session initiation request to establish a communication link towards the first user entity, the second session initiation request including the first user identification.

19 Claims, 6 Drawing Sheets

(52) U.S. Cl.
CPC ...... *H04L 65/1016* (2013.01); *H04L 65/1063* (2013.01); *H04L 65/1069* (2013.01); *H04L 65/1096* (2013.01); *H04W 76/11* (2018.02)

(56) References Cited

U.S. PATENT DOCUMENTS

| | | | |
|---|---|---|---|
| 7,395,336 B1 | 7/2008 | Santharam et al. | |
| 7,640,036 B2 | 12/2009 | Kallio | |
| 7,721,106 B2 | 5/2010 | Zhang | |
| 8,083,586 B2 | 12/2011 | Foe et al. | |
| 8,340,084 B2 | 12/2012 | Nakada et al. | |
| 8,582,566 B2 | 11/2013 | Bae et al. | |
| 8,811,954 B1 | 8/2014 | Mahdi et al. | |
| 8,812,382 B2 | 8/2014 | Koskinen et al. | |
| 2002/0193093 A1 | 12/2002 | Henrikson et al. | |
| 2004/0180676 A1* | 9/2004 | Haumont | H04W 8/26 455/461 |
| 2004/0208144 A1 | 10/2004 | Vinayakray-Jani | |
| 2004/0225878 A1 | 11/2004 | Costa-Requena et al. | |
| 2005/0014485 A1* | 1/2005 | Kokkonen | H04L 63/101 455/411 |
| 2005/0059398 A1 | 3/2005 | Jaupitre et al. | |
| 2005/0278447 A1 | 12/2005 | Raether et al. | |
| 2006/0178131 A1 | 8/2006 | Huotari et al. | |
| 2006/0271800 A1* | 11/2006 | Li | G06F 1/3228 713/300 |
| 2007/0189301 A1 | 8/2007 | Kiss et al. | |
| 2007/0190990 A1 | 8/2007 | Yin | |
| 2007/0249342 A1 | 10/2007 | Huang et al. | |
| 2007/0259651 A1 | 11/2007 | Bae et al. | |
| 2008/0002820 A1* | 1/2008 | Shtiegman | H04L 29/06027 379/211.02 |
| 2008/0008157 A1* | 1/2008 | Edge | H04W 4/22 370/351 |
| 2008/0080480 A1 | 4/2008 | Buckley et al. | |
| 2008/0123625 A1* | 5/2008 | Buckley | H04M 7/123 370/352 |
| 2008/0215736 A1 | 9/2008 | Astrom et al. | |
| 2008/0263631 A1 | 10/2008 | Wang et al. | |
| 2008/0267171 A1 | 10/2008 | Buckley et al. | |
| 2008/0299971 A1 | 12/2008 | Cai et al. | |
| 2009/0034736 A1 | 2/2009 | French | |
| 2009/0193131 A1 | 7/2009 | Shi | |
| 2009/0307482 A1 | 12/2009 | McCann | |
| 2010/0015968 A1* | 1/2010 | Moriwaki | H04M 3/42263 455/422.1 |
| 2010/0020790 A1* | 1/2010 | Pallares Lopez | H04L 29/06027 370/352 |
| 2010/0157985 A1 | 6/2010 | Nakada et al. | |
| 2010/0177780 A1 | 7/2010 | Ophir et al. | |
| 2010/0182998 A1 | 7/2010 | Nakada et al. | |
| 2010/0189248 A1* | 7/2010 | Ding | H04L 12/6418 379/211.02 |
| 2010/0215018 A1 | 8/2010 | Ejzak | |
| 2010/0274908 A1 | 10/2010 | Koskelainen | |
| 2010/0312897 A1* | 12/2010 | Allen | H04L 12/1822 709/227 |
| 2011/0161508 A1* | 6/2011 | Kim | H04L 65/4015 709/228 |
| 2011/0164613 A1 | 7/2011 | Xie | |
| 2011/0270995 A1* | 11/2011 | Mutikainen | H04L 29/12584 709/227 |
| 2012/0005157 A1 | 1/2012 | Forsberg et al. | |
| 2012/0026946 A1 | 2/2012 | Zhu et al. | |
| 2012/0042396 A1* | 2/2012 | Guerra | G06F 21/88 726/30 |

FOREIGN PATENT DOCUMENTS

| | | |
|---|---|---|
| CN | 101437093 | 5/2009 |
| CN | 101641937 | 2/2010 |
| EP | 1523208 | 4/2005 |
| EP | 1853037 | 11/2007 |
| EP | 2061269 | 5/2009 |
| EP | 2068529 | 6/2009 |
| JP | 2001202014 | 7/2001 |
| JP | 2001297029 | 10/2001 |
| JP | 2007515690 | 6/2007 |
| JP | 2008543474 | 12/2008 |
| KR | 20090130296 | 12/2009 |
| WO | 03092218 | 11/2003 |
| WO | 2006120289 | 11/2006 |
| WO | 2008120028 | 10/2008 |
| WO | 2008145610 | 12/2008 |
| WO | 2008152133 | 12/2008 |
| WO | 2009074846 | 6/2009 |
| WO | 2010031230 | 3/2010 |
| WO | 2011072747 | 6/2011 |

OTHER PUBLICATIONS

Ericsson., 3GPP TSG SA WG2 Architecture—S2, No. 56, Jan. 15-19, 2007, 10 Pages, "Consideration of the relationship between Domain Selection and Personal Network Management."

Antipolis., ETSI TS 123 228 V6.8.0, 2004, 181 Pages, "Digital cellular telecommunications system (Phase 2plus); Universal Mobile Telecommunications Systems (UMTS); IP Multimedia Subsystem (IMS); Stage 2."

Rosenberg et al. Standards Track, RFC 3261, Jun. 2002, 240 Pages, "SIP Session Initiation Protocol."

Gonzalo., John Wiley and Sons Ltd, 2004, 20 Pages, "SIP Entities."

Gonzalo Camarillo et al. John Wiley and Sons Ltd, 2004, All together 423 Pages, "Chapter 5. Session Control in the IMS."

Korean Notice of Decision for Patent Translation attached to original for Korean Application No. KR 10-2015-0173431, Both completed by the Korean Patent Office, dated Mar. 20, 2017, All together 9 Pages.

* cited by examiner

APPLICATION SERVER FOR MANAGING COMMUNICATIONS TOWARDS A SET OF USER ENTITIES

CROSS-REFERENCE TO RELATED APPLICATION

This application is the U.S. national phase of PCT Appln. No. PCT/EP2011/063769 filed on Aug. 10, 2011, which claims priority to European Patent Application No. 10172604.0 filed on Aug. 12, 2010, the disclosures of which are incorporated in their entirety by reference herein.

TECHNICAL FIELD

The present invention relates to mobile communications, in particular to mobile voice communications over communication networks.

BACKGROUND

For mobile data communications, layered communication networks may be deployed as e.g. described by the 3GPP specification (3rd Generation Partnership Project). The 3GPP specification comprises three distinct layers: an application layer, a network control layer and a connectivity layer. The application layer supports end-user applications and may be implemented in mobile stations or application servers in the network. The application layer interfaces with the network layer to enable designing and implementing different services and applications. The network control layer supports communicating services across e.g. different types of networks such as circuit-switched domain networks based on the GSM standard using e.g. an ISDN-related technology or packet-switched networks employing e.g. the GPRS (General Packet Radio Service) technology. The connectivity layer is a transport layer capable of transporting any type of service via e.g. voice, data and multimedia streams.

The 3GPP specification defines the Long Term Evolution (LTE) as an access network technology. For delivering multimedia services across an access network, the 3GPP specification defines the IP Multimedia Subsystem (IMS). The IMS comprises a service layer forming an application layer, a control and connectivity layer forming a network control layer, and an access layer forming a connectivity layer. The control and connectivity layer comprises call session control functions (CSCF) forming central entities for Session Initiation Protocol (SIP) signalling. According to the IMS, an application server is provided for hosting and executing services for user entities. An example of an application server is the Multimedia Telephony Service server (MMTel) offering multimedia communications such as voice. Another example of an application server is the Voice Call Continuity Server (VCC).

According to the IMS, the application server interfaces with the Serving CSCF (S-CSCF) using the Session Initiation Protocol (SIP). The S-CSCF transmits a SIP invite message towards the application server in order to establish a communication link towards a user entity. The SIP invite message addresses the user entity using a public identification such as Mobile Subscriber Integrated Services Digital Network Number (MSISDN). If the user entity is available, then the application server returns the SIP invite message towards the S-CSCF. The S-CSCF forwards the received SIP invite message towards the user entity. However, the public identification may also address a set of user entities, each having an own Subscriber Identity Module (SIM) of a Multi-SIM arrangement. In that case, the S-CSCF generates a plurality of copies of the received SIP invite message from the application server, and transmits the plurality of copies towards the set of user entities, which is also referred to as forking.

SUMMARY

It is the object of the present invention to provide an efficient concept for efficiently managing communications towards a set of user entities.

This object is achieved by the features of the independent claims. Further embodiments of the invention are described in the dependent claims.

The invention is based on the finding that an application server which is capable of directly addressing any user entity in the set of user entities may efficiently manage communications towards the set of user entities.

With exemplary reference to a Multi-SIM arrangement, the set of user entities may comprise a plurality of SIMs which may collectively be addressable by a public identification such as the MSISDN. In response to receiving the session initiation request from a network control entity such as the S-CSCF, the application server may first determine user identifications uniquely identifying the SIMs in the set of user entities. Thereafter, the application server may fork a plurality of session initiation requests towards the SIMs in the Multi-SIM arrangement upon the basis of the determined user identifications. However, the application server may also select certain user entities in the set of user entities and selectively fork session initiation messages only towards the selected certain user entities. In particular, the session initiation request may be transmitted towards only one user entity which is currently communicating in the set of user entities. Thereby, a user communicating via the user entity may be directly informed about e.g. an incoming call.

According to an aspect, the invention relates to an application server for managing communications towards a set of user entities which may comprise a first user entity. The application server may comprise a receiver for receiving the first session initiation request, the first session initiation request comprising a public identification identifying the set of user entities. Further, the application server may comprise a processor for assigning a first user identification to the public identification, the user identification identifying the first user entity. In addition, the application server may comprise a transmitter for transmitting a second session initiation request to establish a communication link towards the first user entity, wherein the session initiation request comprises the first user identification. The set of user entities may comprise only one user entity, e.g. only one SIM. However, the set of user entities may comprise a plurality of user entities, e.g. a plurality of SIMs forming a Multi-SIM arrangement. The application server may manage mobile communications towards the set of user entities over a packet-switched mobile communication network such as the IMS communication network. The first session initiation request may indicate e.g. a call towards the set of user entities which are addressed by the public identification. However, the first session initiation request may indicate a multimedia data stream or a short message or a multimedia message to be transmitted towards the set of user entities addressed by the public identification.

According to an embodiment, the processor may be configured to determine a current communication state of the first user entity, wherein the transmitter may be configured to transmit the second session initiation request towards the first user entity if or only if the communication state indicates that the first user entity is currently communicating. For determining the current communication state of the first user entity, the processor may retrieve information indicating the last known communication stage of the first user entity e.g. from a memory or from a network entity having information on the current communication state of the first user entity. Generally, the communication state may comprise a busy state or an idle state, or a non-available, e.g. switched-off, state.

According to an embodiment, the set of user entities may comprise a plurality of user entities, wherein the transmitter is configured to fork a plurality of session initiation requests towards the set of user entities in response to receiving the first session initiation requests by the application server or e.g. a communication network. The session initiation request may be received over a communication network from a network control entity such as the S-CSCF which manages establishing communication sessions.

The plurality of session initiation requests may simultaneously be transmitted towards the set of user entities for e.g. a simultaneous ringing at the user entities. However, the session initiation requests may successively be transmitted towards the set of user entities, wherein a transmission order of the session initiation requests may be determined by different priorities of the user entities in the set of user entities. Each session initiation request of the plurality of session initiation requests may respectively be provided with a user identification uniquely identifying a respective user entity in the set of user entities.

According to an embodiment, the set of user entities may comprise a second user entity, wherein the processor is configured to assign a second user identification to the public identification, the second user identification identifying, e.g. uniquely identifying, the second user entity. The transmitter may be configured to transmit a third session initiation request to establish a communication link towards the second user entity, the first session initiation request comprising the second user identification. By way of example, the second and third session initiation request may simultaneously be transmitted for e.g. a simultaneous ringing at the user entities. However, the first and third session initiation request may successively be transmitted, if e.g. the first user entity has a priority which is higher than a priority of the second user entity. The priority associated with the respective user entity may be determined by a user operating the first and the second user entity, e.g. in a Multi-SIM arrangement.

According to an embodiment, the set of user entities comprises a second user entity, e.g. the aforementioned second user entity. The processor may be configured to determine a first communication state of the first user entity and to determine a second current communication state of the second user entity. Furthermore, the processor may be configured to initiate a transmission of the second session initiation request towards the first user entity if the first communication state indicates that the first user entity is currently communicating and to inhibit a transmission of a third session initiation request towards the second user entity if the second communication state indicates that the second user entity is currently not communicating, e.g. idle. Thus, e.g. an incoming call indicated by the first session initiation request may be indicated only to that user entity which is currently busy to directly inform a user operating that network entity about the incoming call. Hence, an unnecessary ringing at the other user entity which is not busy may be avoided. For detecting the respective current communication state, the processor may perform the aforementioned procedure for detection of the communication state or any other corresponding procedure e.g. according to the 3GPP specification.

According to an embodiment, the receiver is configured to receive the first user identification of a communication network e.g. from a network entity such as the S-CSCF in the case of an IMS communication network. By way of example, the application server may receive the first user identification upon registering the first user entity in the communication network. The second user identification may correspondingly be provided to the application server.

According to an embodiment, the processor may be configured to assign the first user identification to the public identification and/or to assign the second user identification to the public identification upon the basis of a look-up table. The look-up table may be stored in a memory of the application server or may be stored in a remote network memory which is accessible by the application server over the communication network.

According to an embodiment, the first user identification may be assigned to a SIM of the first user entity. Correspondingly, the second user identification may be assigned to the SIM of the second user entity.

According to an embodiment, the first user identification may identify a SIM of the first user entity. Correspondingly, the second user identification may identify the SIM of the second user entity.

According to an embodiment, the first user entity may be a SIM. Correspondingly, the second user entity may be a SIM.

According to an embodiment, the public identification may comprise at least one of: a Mobile Subscriber Integrated Services Digital Network Number (MSISDN), a Uniform Resource Identifier (URI), a telephone number or a Session Initiation Protocol URI (SIP URI).

According to an embodiment, the first user identification and/or the second user identification may comprise at least one of: an International Mobile Subscriber Identity (IMSI), an IMS Private User Identification (IMPI) or a Globally Routable User Agent Uniform Resource Identifier (GRUU).

According to an embodiment, the transmitter may be configured to transmit the second session initiation request upon the basis of the Session Initiation Protocol (SIP) e.g. towards a communication network, in particular towards a network control entity such as the S-CSCF.

According to an embodiment, the application server may be an IP Multimedia Subsystem (IMS) application server, in particular an IMS Multimedia Telephone Service (MMTel) application server. The MMTel may receive the first session initiation requests from the S-CSCF and may fork a plurality of session initiation requests towards the set of user entities via the S-CSCF.

According to an embodiment, the MMTel and the S-CSCF are remote network entities communicating with each other over an IMS communication network. According to another embodiment, the MMTel and the S-CSCF may be collocated network entities communicating with each other over e.g. an interface.

According to an embodiment, the invention relates to a communication system comprising the application server for managing communications towards a set of user entities according to the principles described herein. Furthermore, the communication system may comprise a network control entity, in particular the S-CSCF.

The network control entity may be configured to receive the second session initiation request and to forward the second session initiation request towards the first user entity. Correspondingly, the network control entity may be configured to receive the third session initiation request from the application server and to forward the third session initiation request towards the second user entity.

According to an embodiment, the network control entity may transmit the respective user identification such as IMSI towards the application server when e.g. registering the respective user entity for communications.

According to an aspect, the invention relates to a method for managing communications towards a set of user entities, wherein the set of user entities may comprise a first user entity. The method may comprise receiving a first session initiation request, the first session initiation request comprising a public identification identifying the set of user entities. The method may further comprise assigning a first user identification to the public identification, the first user identification identifying the first user entity. Furthermore, the method may comprise transmitting the second session initiation request to establish a communication link towards the first user entity, the second session initiation request comprising the first user identification. The method may be performed by the above-mentioned application server.

Further method steps may be directly derived from the functionality of the application server for managing communications towards the set of user entities according to the principles described herein.

BRIEF DESCRIPTION OF THE DRAWINGS

Further embodiments will be described with reference to the following figures, in which.

DETAILED DESCRIPTION

Figure 1:
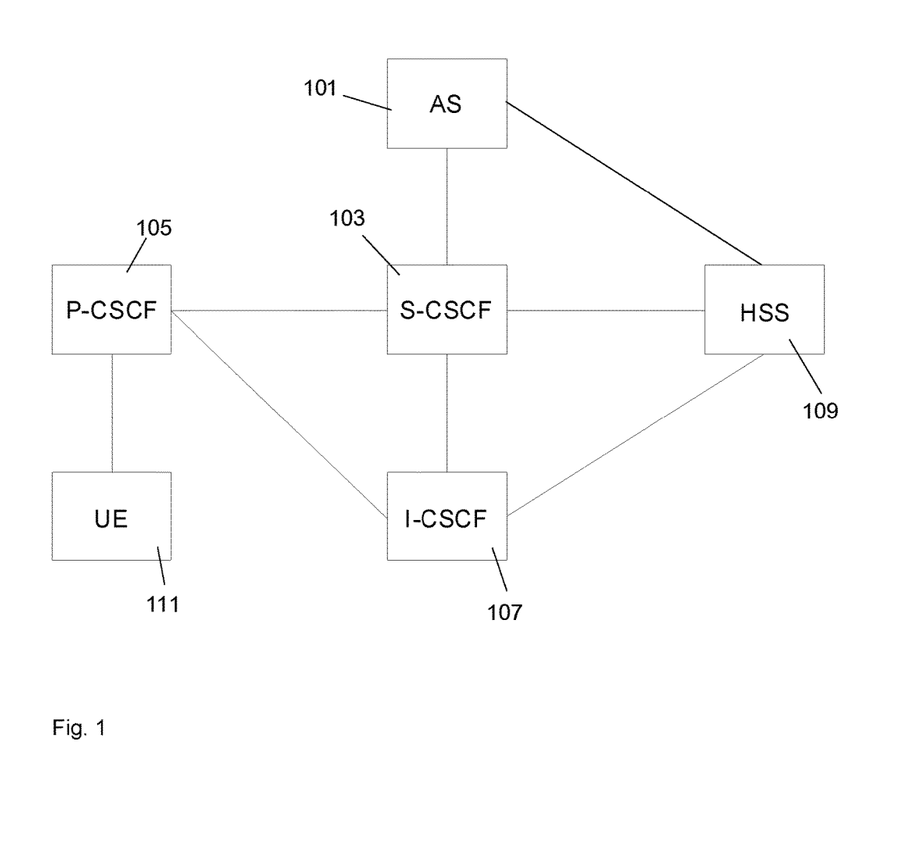
FIG. 1 shows a block diagram of a communication system according to an embodiment.

FIG. 1 exemplarily shows a block diagram of a communication system implementing the IMS architecture as defined by the 3GPP specification TS 23.228. The communication system comprises an application server 101 (AS), a Serving Call Session Control Function 103 (S-CSCF), a Proxy-CSCF 105 (P-CSCF), and an Interrogating-CSCF (I-CSCF) 107. The S-CSCF 103, the P-CSCF 105 and the I-CSCF 107 respectively form embodiments of network control entities communicating with each other. The S-CSCF 105 and the I-SCSF 105 further communicate with a Home Subscriber Server 109 (HSS). The P-CSCF 105 communicates with at least one user entity 111 (UE).

The S-CSCF 103, the P-CSCF 105 and the I-CSCF 107 are used to process Session Initiation Protocol (SIP) signalling packets in the IMS communication system. The S-CSCF 103 is a central node of the signalling layer and is arranged to handle SIP registrations of a UE 111 for IMS communications. In particular, the S-CSCF 103 has knowledge of a user identification such as IMSI uniquely identifying the user entity 111. The I-CSCF 107 is arranged to query the HSS 109 to obtain an address of the S-CSCF 103, and to assign the S-CSCF 103 to the user entity 111 for performing the SIP registration. The I-CSCF 107 also forwards session initiation requests such as SIP invites towards the S-CSCF, and receives session initiation requests from the S-CSCF 103. The P-CSCF 105 is a SIP proxy that is the first point of contact for the UE 111. The AS 101 is SIP application server, e.g. a Multimedia Telephony Service server (MMTel) or a Voice Call Continuity Server (VCC). The AS 101 hosts and executes services for the UE 111. The AS 101 interfaces with the S-CSCF 103 using the SIP protocol, and interfaces with the HSS 109 using the Sh interface as defined by the IMS standard.

According to an embodiment, the communication system shown in FIG. 1 may also handle a plurality of user entities being associated with the same subscriber and being addressable by the same public identification such as a MSISDN. By way of example, in case of a mobile terminating call towards the set of user entities, the I-CSCF 107 receives a session initiation request, e.g. a SIP invite, from another I-CSCF or S-CSCF which handles communications of the calling user entity. The received session initiation request addresses the set of user entities using the public identification. Then, the I-CSCF 107 forwards the session initiation request towards the S-CSCF 103, and the S-CSCF 103 forwards the session initiation request towards the AS 101. The AS 101 determines upon the basis of the received public identification in the session initiation request the user identifications uniquely identifying the user entities in the set of user entities, and transmits a plurality of session initiation requests towards the S-CSCF 103 if the user entities in the set of user entities are available for communications. In particular, each session initiation request addresses a dedicated user entity in the set of user entities. The S-CSCF 103 receives and forwards the plurality of session initiation requests towards the user entities in the set of user entities via the P-CSCF 105. However, the AS 101 may determine that e.g. one user entity in the set of user entities is currently communicating. In this case, the AS 101 selectively transmits only one session initiation request addressing only the communicating user entity using its user identification.

Figure 2:
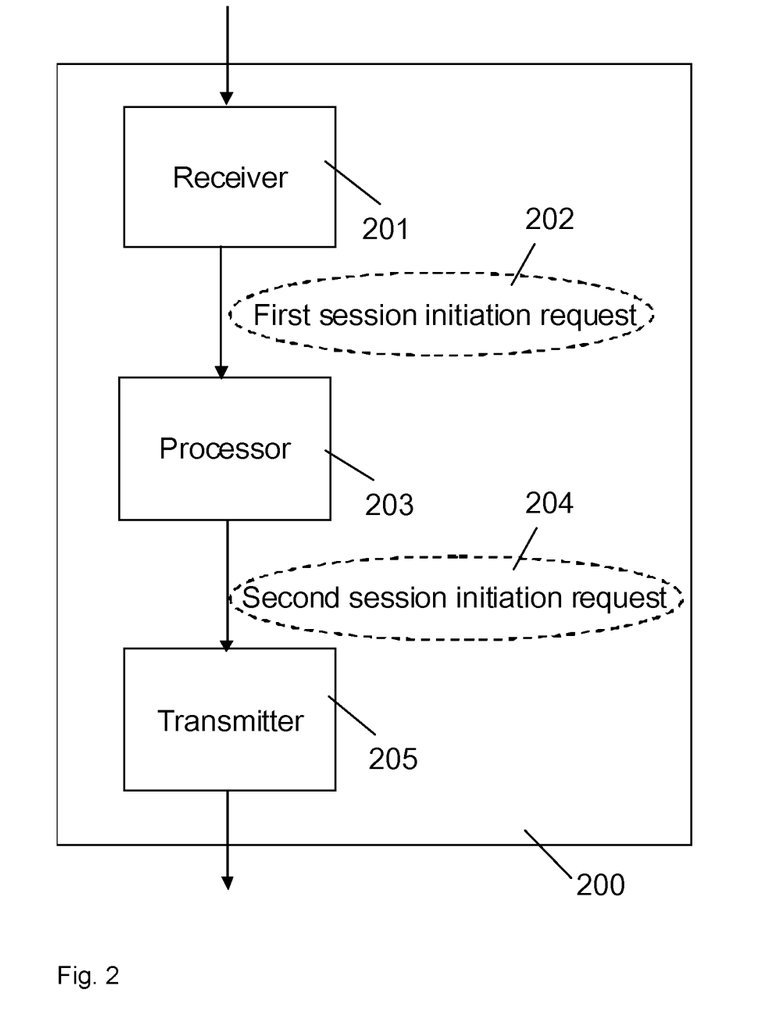
FIG. 2 shows a block diagram of an application server according to an embodiment.

FIG. 2 shows a block diagram of an application server 200 for managing communications towards a set of user entities which are not depicted in FIG. 2. The application server 200 comprises a receiver 201 for receiving a first session initiation request 202 which comprises a public identification such as the MSISDN identifying the set of user entities. The application server 200 further comprises a processor 203 for assigning a first user identification, e.g. a first IMSI, to the public identification in order to uniquely identify the first user identity. The application server 200 further comprises a transmitter 205 for transmitting a second session initiation request 204 to establish a communication link towards the first user entity, wherein the second session initiation request 204 comprises the first user identification.

According to an embodiment, the receiver 201 and the transmitter 205 are arranged for communicating over a communication network, e.g. over an IMS communication network, with e.g. the S-CSCF. In this regard, the receiver 201 may comprise a receive filter, a signal detector, a demodulator etc. Correspondingly, the transmitter 205 may comprise a transmit filter, a modulator, etc. According to an embodiment, the application server comprises an antenna for wireless communications. According to an embodiment, the application server is arranged for baseband communications over a cable. According to an embodiment, the receiver 201 and the transmitter 205 are configured to communicate according to the IP.

According to an embodiment, the application server 200 is configured to manage communications towards the set of user entities which comprises a plurality of user entities. Upon receiving the first session initiation request 202 addressing the set of user entities by the public identification, the processor 203 determines the current communications states of the user entities in the set of user entities. If, by way of example, a communication state indicates that a certain user entity in the set of user entities is communicating, e.g. as a calling party, then the processor 203 initiates a transmission of the second session initiation request 204 only towards that certain user entity in the set of communicating entities. In that case, the processor 203 decides not to transmit any session initiation message towards the remaining user entities in order to avoid e.g. an unnecessary ringing at the remaining user entities to indicate an incoming call.

However, the processor 203 may determine that none of the user entities in the set of user entities is communicating, i.e. busy. In that case, according to an embodiment, the application server forks in response to receiving the first session initiation request 202 a plurality of session initiation requests towards the set of user entities. Each session initiation request addresses only one user entity in the set of user entities upon the basis of a user identification, such as IMSI in a Multi-SIM, arrangement, identifying that user entity. According to an embodiment, the transmitter 205 transmits the plurality of session initiation requests, each comprising a user identification towards the communication network, in particular towards a network control entity such as the S-CSCF.

According to an embodiment, each session initiation request is communicated upon the basis of the SIP protocol. Thus, the first session initiation request 202, when communicating over an IMS communication network, is a SIP invite message indicating e.g. a call request towards the set of user entities. Correspondingly, the forked session initiation requests towards the user entities in the set of user entities are formed by SIP invite messages directly addressing the user entities in the set of user entities. According to an embodiment, the transmitter 205 is arranged to simultaneously fork the session initiation requests towards the set of user entities. However, according to an embodiment, the transmitter 205 is arranged to successively transmit the session initiation requests towards the user entities beginning, by way of example, with a user entity having a highest priority in the set of user entities and so forth. According to an embodiment, the priorities of the user entities are determined by a user operating the user entities.

According to an embodiment, the user entities are SIMs of a Multi-SIM arrangement providing a service supporting communications of several mobile terminals of one user upon the basis of only one telephone number, e.g. an MSISDN or a Master-MSISDN. Accordingly, each SIM has its own IMSI. The SIMs of the Multi-SIM arrangement are addressable by the same MSISDN, i.e. by a Master-MSISDN. According to an embodiment, the SIMs are arranged to form the Multi-SIM set registered in a Home Location Register (HLR) or in a HSS.

In the case of a mobile originated call (MOC), each user entity in the set of user entities, e.g. each SIM of the Multi-SIM arrangement, may be independently used for mobile originated calls, wherein the public identification identifying the calling party to the called party is the Master-MSISDN.

In the case of a mobile terminated call (MTC), all user entities in the set of user entities, e.g. all SIMs of the Multi-SIM arrangement, may be idle so that the MTC may be indicated to the user entities by e.g. a parallel ringing. In that case, the first user identity accepting the incoming call gets connected to the calling party, wherein the communication links towards the remaining user entities are disconnected. However, if one user entity is busy, then only the busy user entity may be used for the call termination which results in a call waiting procedure or in CFB.

With reference to the IMS, the set of user entities comprises according to an embodiment up to five or six devices associated with one IMS public identification, such as a telephone URI or a SIP URI which are related to an MSISDN, e.g. to a Master-MSISDN. According to an embodiment, also device specific IMS Public User Identifications (IMPUs) may be deployed for communicating services towards the user entities, wherein the set of user entities is bound to the public identification, such as the MSISDN correlating to the IMPU which is defined via Customer Relation Management (CRM) during a provisioning process.

According to an embodiment, each user entity in the set of user entities is identified by its own IMSI which corresponds to an IMPI (IMS Private User ID). Moreover, the public identification relates to the MSISDN, e.g. to the Master-MSISDN, and may be a visible identification to an end user entity. Thus, a call addressing the MSISDN may result in a parallel ringing if all user entities in the set of user entities are idle, so that the first user entity accepting the call releases the call attempts to the other user entities. Furthermore, if one user entity in the set of user entities is already in call, i.e. busy, then the MTC results in either a call waiting or in a busy condition which may depend on a setting in the application server 200 or the terminal which is or may comprise a user entity. According to an embodiment, the application server 200, upon the basis of the user identifications, selectively routes messages or calls to dedicated user entities in the set of user entities. Thus, the Call Detail Records (CDRs) which may be created by the application server 200 in the IMS environment may include e.g. an IMSI identifying an SIM, and an MSISDN.

Figure 3:
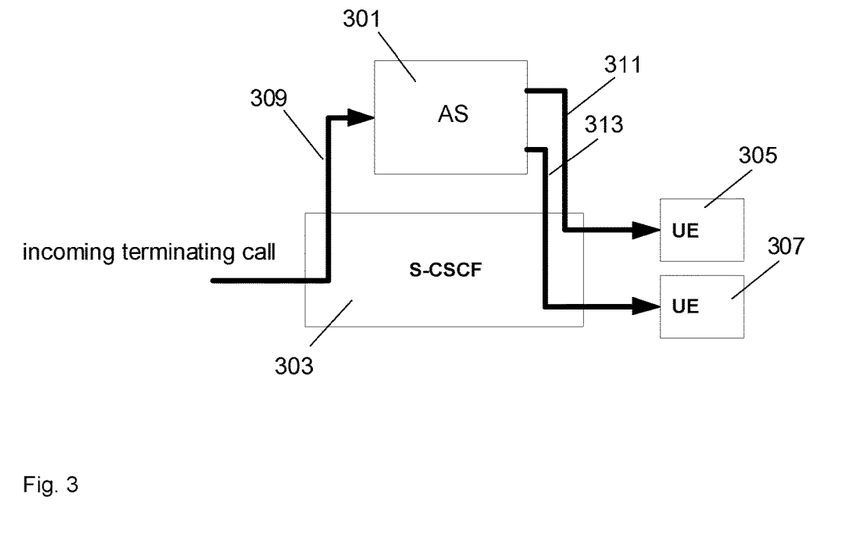
FIG. 3 shows a block diagram of a communication system according to an embodiment.

FIG. 3 shows a block diagram of a communication system according to the IMS. The communication system comprises an application server 301 (AS) and a network control entity 303, e.g. a S-CSCF. FIG. 3 further depicts a first user entity 305 (UE) and a second user entity 307 (UE) which are arranged to communicate with the network control entity 303. According to different embodiments, the user entities 305 and 307 are elements or are not elements of the communication system. The user entities 305 and 307 form a set of user entities, e.g. a set of SIMs in a Multi-SIM arrangement. According to an embodiment, the application server 301 has the structure of the application server shown in FIG. 2.

According to an embodiment, in service, the network control entity 303 transmits a first session initiation request 309 towards the application server 301 e.g. over an IMS communication network upon receiving a message indicating an incoming terminating call. The first session initiation request addresses the set of user entities 305, 307 using a public identification, such as an MSISDN. Upon receiving the first session initiation request, the application server determines a communication state of each of the user entities 305 and 307. If the user entities 305, 307 are not communicating, then the application server 301 forks session initiation requests towards the user entities 305 and 307 respectively using a user identification of the respective user entity 305, 307. More specifically, the application server 301 transmits a second session initiation request 311 towards the first user entity 305 using the user identification, such as the IMSI of the first user entity 305. Furthermore, the application server 301 transmits a third session initiation request 313 towards the second user entity 307 using the user identification identifying the second user entity 307, e.g. the IMSI associated with the second user entity 307.

According to an embodiment, the application server 301 is an MMTeI or terminates an MMTeI logic including a Multi-SIM arrangement. Thus, the application server 301 may initiate a parallel ringing at the user devices 305 and 307 by addressing the user devices 305, 307 using their IMSIs or GRUUs.

According to an embodiment, the application server 301 determines the user identifications, e.g. IMSIs, of the user entities 305, 307 which are associated with the public identification received with the first session initiation request 309. Thus, the user entities 305, 307 may selectively be addressed. By way of example, the application server 301 receives the user identifications from the S-CSCF as depicted in FIG. 4 with reference to the embodiment of FIG. 3.

Figure 4:
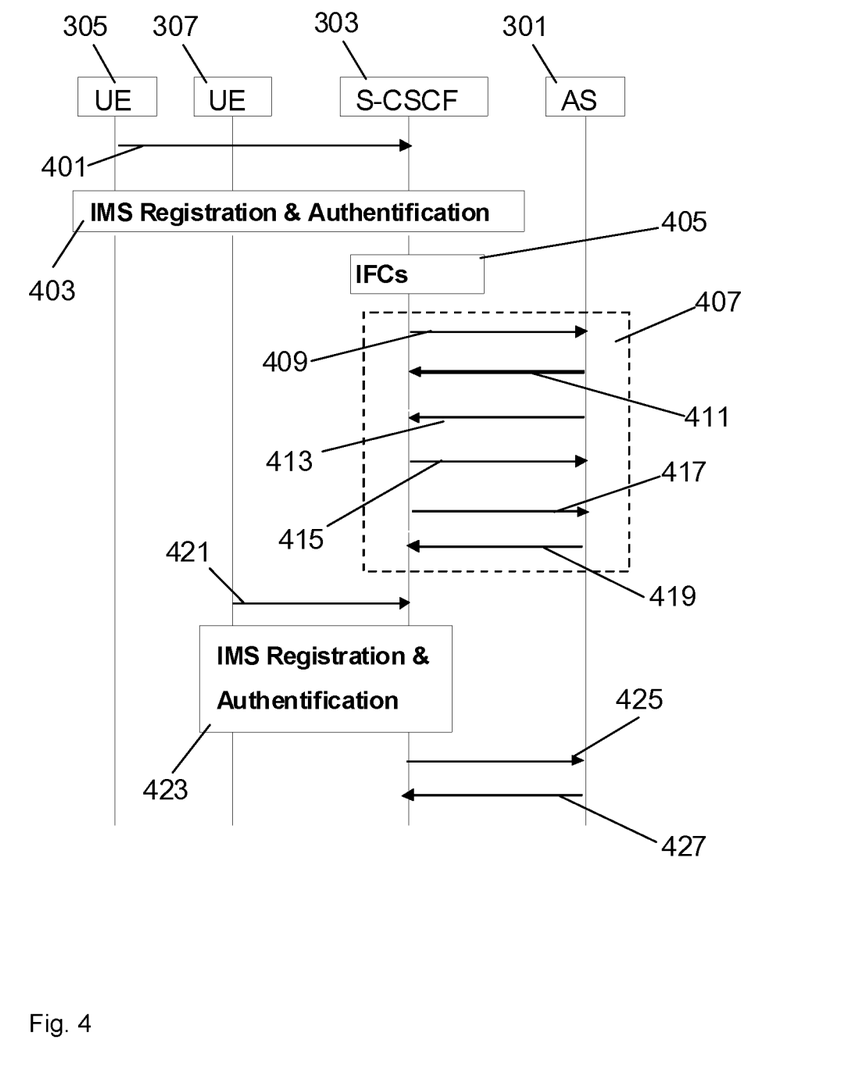
FIG. 4 shows registration messages exchanged in a communication system according to an embodiment.

FIG. 4 shows an embodiment of registration messages which are exchanged between the entities of the communication system shown in FIG. 3 during a registration procedure. The communication system comprises the application server 301 (AS) and the network control entity 303 (S-CSCF). Furthermore, FIG. 4 also depicts the first user entity 305 (UE) and the second user entity 307 (UE).

Firstly, the first user entity 305 registers to the network control entity 303 with its IMPI using e.g. the SIP REGISTER message 401. Thereafter, an IMSI registration and authentification procedure 403 is performed using the IMPI and the IMPU of the first user entity 305 according to the IMS specification of the 3GPP. Thereafter, the network control entity 303 may optionally apply the IFCs (Initial Filter Criteria) 405 for the first user entity 305. Thereafter a third-party registration 407 is performed to the network control entity 303.

According to an embodiment, the third-party registration 407 comprises transmitting a message 409 by the network control entity 303 to the application server 301 to register the IMPU. The message 409 comprises the public identification, e.g. an MSISDN. Upon receiving said message, the application server 301 responds with the acknowledgement 200 OK 411. Thereafter, the application server 301 transmits a subscribe to reg event package message 413 towards the network control entity 303. Thereafter, the network control entity 303 returns an acknowledgement 200 OK 415 towards the application server 301. Thereafter, the network control entity 303 notifies the IMPU associated with the first user entity 305 towards the publication server 301 using the SIP NOTIFY message 417. In particular, the network control entity 303 transmits with the SIP NOTIFY message 417 an IMPI of the first user entity 305 towards the application server 301. The IMPI of the first user entity corresponds to the IMSI of the first user entity 305. In addition, the GRUU of the first user entity 305 may be transmitted towards the application server 301 with the SIP NOTIFY message 417.

In response thereto, the application server 301 acknowledges with the 200 OK message 419.

Thereafter, the second user entity 307 correspondingly registers to the network control entity 303. According to an embodiment, the second user entity 307 registers to the network control entity 303 with its IMPI using a SIP REGISTER message 421. Thereafter, an IMSI registration and authentification procedure 423 is performed using the IMPI and the IMPU of the second user entity 307 according to the IMS specification of the 3GPP. Thereafter, a notification 425, e.g. a SIP NOTIFY message, may be sent towards the application server 301 to inform about the registration of the second user entity 307. Thereafter, a 200 OK message 427 may be transmitted.

According to an embodiment, the application server 301 receives two user identifications for each user entity 305, e.g. the GRUU and the IMSI. However, it shall be noted that the application server 301 may receive only one user identification, e.g. only a GRUU or only an IMSI, for each user entity 305, 307.

According to an embodiment, the GRUU allows a user entity specific routing within the IMS domain. By way of example, the GRUU may be constructed for the respective user entity 305, 307 upon the basis of the +sip.instance field as defined by the IMS standard. The IMSI allows the set of user entities to interwork within the 2G/3G domain, e.g. to transform a MAP FORWARD_SM message (SMS-MP) addressed to IMSI into a SIP message addressed to the IMPU or IMSI or GRUU of the respective user entity 305, 307.

According to an embodiment, the application server 301 is a MMTeI which stores at least one of the user identifications for each user entity 305, 307 for e.g. call-handling such that a decision may be made whether to establish parallel communication links towards the user entities or whether to selectively rout towards a dedicated user entity in dependence on a communication state, e.g. a call state.

According to an embodiment, an IMPI and/or an IMSI are added in the SIP NOTIFY messages 417 and 427 in order to provide the application server 301 with the user identifications. Thus, the user entities 305 and 307 are individually addressed even if the set of user entities is publicly addressable using the public identification, e.g. the MSISDN. In particular in 3GPP mobile networks, the IMPI may be derived from the IMSI, so that 2G/3G applications and data may be linked e.g. via INAP (Intelligent Network Application Part), CAMEL (Customized Application for Mobile Network Enhanced Logic), MAP (Mobile Application Part) etc. According to an embodiment, the network control entity 303 emulates the GRUU on behalf of the respective user entity 305, 307 and use that GRUU for further SIP signaling e.g. during a third-party registration. Furthermore, a user entity specific routing may be performed by network-based services even if not all user entities 305, 307 in the set of user entities support the GRUU feature.

Figure 5:
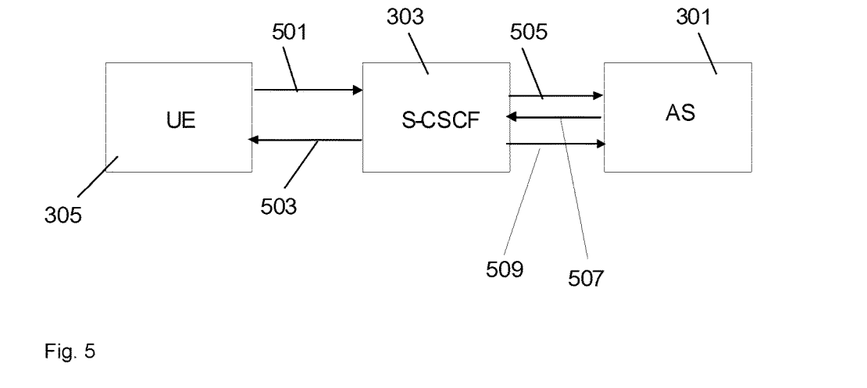
FIG. 5 shows a block diagram of a communication system according to an embodiment.

FIG. 5 shows an embodiment of the registration procedure with exemplary reference to the communication system shown in FIG. 3. The communication system comprises the application server 301 (AS) and the network control entity 303 (S-CSCF). FIG. 5 further shows, by way of example, the first user entity 305 which, according to an embodiment, supports the GRUU. Firstly, the first user entity 305 registers to the network control entity 303 with a SIP NOTIFY message 501. In step 503, the network control entity 303 responds with the 200 OK message 503. The 200 OK message 503 contains the GRUU. Thereafter, the IMPU 505, which is associated with the first user entity 305, is transmitted towards the application server 301 along with the MSISDN forming an embodiment of the public identification. Thereafter, the application server 301 subscribes to the reg event package with a message 507. Thereafter, the network control entity 303 transmits a message 509 comprising the IMPI 501 of the first user entity 305 together with the GRUU towards the application server 301. The IMPI may contain the IMSI in 3GPP mobile networks if e.g. the first user entity 305 comprises or is an SIM. Thereafter, the application server 301 stores the IMPU, the MSISDN, the IMSI and the GRUU. The above procedure correspondingly applies with respect to the second user entity 307.

Figure 6:
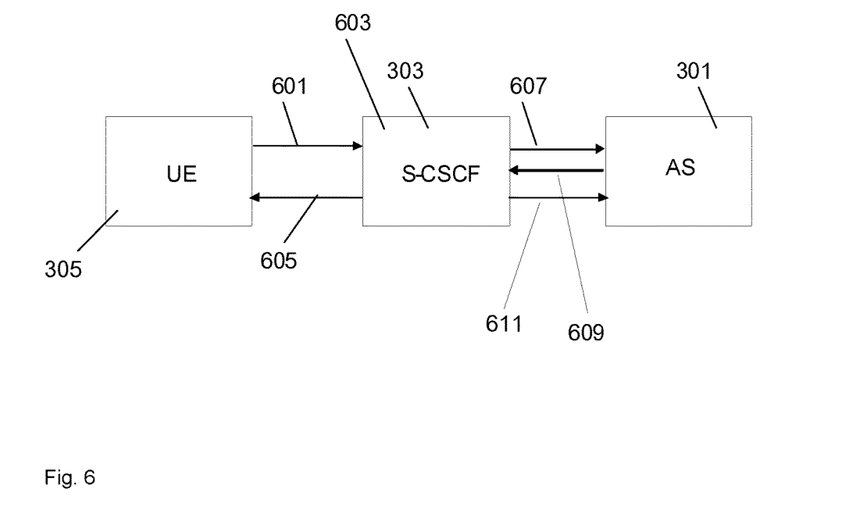
FIG. 6 shows a block diagram of a communication system according to an embodiment.

FIG. 6 demonstrates the registration procedure with exemplary reference to the communication system shown in FIG. 5, when the first user entity 305 does not support the GRUU.

Firstly, the first user entity 305 transmits a SIP.instance message 601 to the network control entity 303. In response thereto, the network control entity 303 detects that the first user entity 305 does not support the GRUU. In that case, the network control entity 303 may create a GRUU on behalf of the first user entity 305 and use it for further communications. Thereafter, the network control entity transmits the 200 OK message 603 towards the first user entity 305. Thereafter, the messages 605 and 607 may be exchanged, wherein the message 605 corresponds to the message 505, and wherein the message 607 corresponds to the message 507 as described with reference to FIG. 5. Thereafter, the network control entity 303 ensures that the third-party registration message and the reg event package notification comprises the emulated GRUU. Thereafter, the application server 301 stores the IMPU, the MSISDN and the IMSI as described with reference to FIG. 5.

Figure 7:
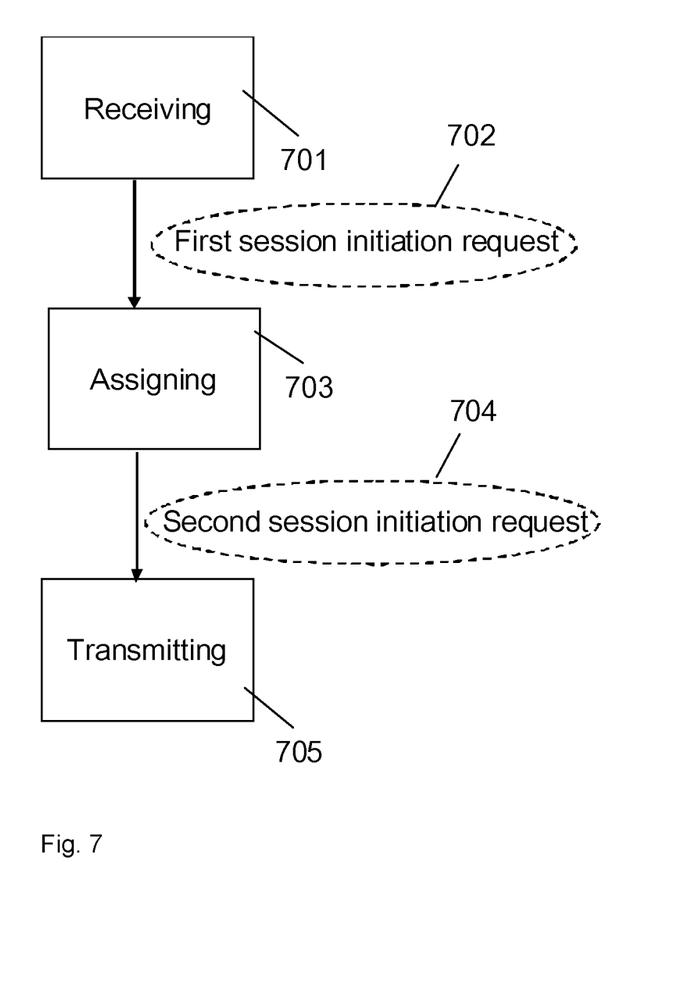
FIG. 7 shows a diagram of a method for managing communications towards a set of user entities according to an embodiment.

FIG. 7 shows a diagram of a method for managing communications towards a set of use entities, wherein the method may be performed by the application server 200 and/or 301. The method comprises receiving 701 a first session initiation request 702 comprising the public identification, e.g. an MSISDN, identifying the set of user entities, assigning 703 the first user identification to the public identification, and transmitting 705 a second session initiation request 704 to establish a communication link towards the first user entity, wherein the second session initiation request 704 comprises the first user identification. Further method steps may be directly derived from the functionality of the application server 200, 301.

According to an embodiment, the first session initiation request 702 corresponds to the first session initiation request 202, 309, and the second session initiation request 704 corresponds to the second session initiation request 204, 311.

According to an embodiment, the method further comprises transmitting a third session initiation request towards a second user entity according to the principles described herein.

Some embodiments of the above-described enable to selectively address a user entity in a set of user entities for dedicated communications only towards the dedicated user entity.

Some of the above-described embodiments enable to selectively fork a session initiation request only towards only one user entity in a set of user entities. In particular, the user which is currently communicating using that user entity may directly be informed about an incoming call. Thus, such intelligent forking may avoid disturbing the currently communicating user by ringing at the other user entities which are not used for communications.

The above-mentioned embodiments of the methods of the present invention may be embodied by respective means to form a respective embodiment of a device.

The previous description of the disclosed embodiments is provided to enable any person skilled in the art to make or use the present invention. Various modifications to these embodiments will be readily apparent to those skilled in the art, and the generic principles defined herein may be applied to other embodiments, arrangements or systems without departing from the spirit or scope of the invention. Thus, the present invention is not intended to be limited to the embodiments shown herein but is to be accorded the widest scope consistent with the principles disclosed herein.

The invention claimed is:

1. An application server for managing communications towards a set of user entities associated with a single user subscriber and addressable by a same public identification of the single user subscriber, the set of user entities having a first user entity, wherein the user entities are Subscriber Identity Modules (SIMs) of a Multi-SIM arrangement providing a service supporting communications of several mobile terminals of the single user subscriber upon the basis of only one Mobile Subscriber Integrated Services Digital Network Number (MSISDN) as public identification, the application server comprising:

a receiver for receiving a first session initiation request, the first session initiation request comprising the public identification identifying the set of user entities associated with the single user subscriber and addressable by the same public identification of the single user subscriber, wherein each user entity of the set of user entities has its own International Mobile Subscriber Identity (IMSI), but is addressable by the same public identification of the single user subscriber;

a processor for assigning a first user identification to the public identification, the first user identification identifying the first user entity; and a transmitter for transmitting a second session initiation request to establish a communication link towards the first user entity, the second session initiation request comprising the first user identification, wherein the processor is configured to determine a first communication state of the first user entity and a second communication state of a second user entity of the set of user entities, the communication state being one of a busy state, an idle state and a non-available state, and wherein the transmitter is configured to transmit the second session initiation request towards the first user entity if the first communication state indicates that the first user entity is in the busy state and towards the first and second user entities by a parallel ringing if the first and second communication states indicate that the first and second user entities are in the idle state, and wherein the first user entity accepting the second session initiation causes the second session initiation request towards the second user entity to be terminated, and wherein the application server is configured to receive two user identifications for each user entity, wherein a first user identification of the two user identifications comprises a Globally Routable User Agent Uniform Resource Identifier (GRUU) and a second user identification of the two user identifications comprises an IMSI, wherein the application server is configured to perform a third-party registration comprising an exchange of the following registration messages with a network control entity including:
receiving a first message from the network control entity to register an IMS Public User Identification (IMPU) of the first user entity, wherein the first message comprises the MSISDN of the first user entity, wherein the IMPU of the first user entity is known by the network control entity from a previous IMS registration procedure with the first user entity;
responding with an acknowledgement to the first message;
transmitting a second message to the network control entity, wherein the second message comprises a subscription to a registration event package;
receiving an acknowledgement to the second message;
receiving a SIP Notify message from the network control entity, wherein the SIP Notify message notifies the IMPU and a GRUU associated with the first user entity, wherein the GRUU of the first user entity is emulated by the network control entity on behalf of the first user entity;
responding with an acknowledgement to the SIP Notify message;
receiving a second SIP Notify message from the network control entity, wherein the second SIP Notify message notifies an IMPU and a GRUU associated with the second user entity, wherein the IMPU of the second user entity is known by the network control entity from a previous IMS registration procedure with the second user entity and wherein the GRUU of the second user entity is emulated by the network control entity on behalf of the second user entity; and
responding with an acknowledgement to the second SIP Notify message.

2. The application server of claim 1, wherein the set of user entities comprises a plurality of user entities, and wherein the transmitter is configured to fork a plurality of session initiation requests towards the set of user entities in response to receiving the first session initiation request.

3. The application server of claim 1, wherein the processor is configured to assign a second user identification to the public identification, the second user identification identifying the second user entity, and wherein the transmitter is configured to transmit a third session initiation request to establish a communication link towards the second user entity, the third session initiation request comprising the second user identification.

4. The application server of claim 1, wherein the processor is configured
to initiate a transmission of the second session initiation request towards the first user entity if the first communication state indicates that the first user entity is currently communicating; and
to inhibit a transmission of a third session initiation request towards the second user entity if the second communication state indicates that the second user entity is currently not communicating.

5. The application server of claim 1, wherein the receiver is configured to receive the first user identification over an IP Multimedia Subsystem (IMS) communication network.

6. The application server of claim 1, wherein the processor is configured to assign the first user identification to the public identification upon the basis of a look-up-table.

7. The application server of claim 1, wherein the first user identification is assigned to a Subscriber Identity Module of the first user entity; or wherein the first user identification identifies the Subscriber Identity Module of the first user entity; or wherein the first user entity is a Subscriber Identity Module.

8. The application server of claim 1, wherein the public identification comprises at least one of: a Mobile Subscriber Integrated Services Digital Network Number, a Uniform Resource Identifier, a telephone number, a Session Initiation Protocol Uniform Resource Identifier.

9. The application server of claim 1, wherein the first user identification comprises at least one of: International Mobile Subscriber Identity or Globally Routable User Agent Uniform Resource Identifier or an IMS Private User Identification.

10. The application server of claim 1, wherein the transmitter is configured to transmit the second session initiation request upon the basis of the Session Initiation Protocol.

11. The application server of claim 1, wherein the first session initiation request is a Session Initiation Protocol Invite requesting to establish a communication link, in particular a call, towards the first user entity.

12. The application server of claim 1, being an IP Multimedia Subsystem application server, in particular an IMS Multimedia Telephony Service application server.

13. The application server of claim 1, configured to store at least one of the two user identifications for each user entity for call-handling.

14. The application server of claim 1, wherein the GRUU allows a user entity specific routing within an IP Multimedia Subsystem (IMS) domain; and wherein the IMSI allows the set of user entities to interwork within a 2G/3G domain.

15. The application server of claim 1, wherein the GRUU is emulated by a network control entity on behalf of the respective user entity.

16. The application server of claim 1, wherein the application server is a Multimedia Telephony Service (MMTel) Server.

17. A communication system, comprising:
the application server of claim 1; and
a network control entity, wherein the network control entity is configured to receive the second session initiation request and to forward the second session initiation request towards the first user entity,
wherein the network control entity is a Serving Call Session Control Function (S-CSCF), and
wherein the communication system is a communication system according to the IP Multimedia Subsystem (IMS).

18. A method for managing communications towards a set of user entities associated with a single user subscriber and addressable by a same public identification of the single user subscriber, the set of user entities comprising a first user entity, wherein the user entities are Subscriber Identity Modules (SIMs) of a Multi-SIM arrangement providing a service supporting communications of several mobile terminals of the single user subscriber upon the basis of only one Mobile Subscriber Integrated Services Digital Network Number (MSISDN) as the public identification, the method being performed by an application server, the method comprising:
receiving a first session initiation request, the first session initiation request comprising the public identification identifying the set of user entities associated with the single user subscriber and addressable by the same public identification of the single user subscriber, wherein each user entity of the set of user entities has its own International Mobile Subscriber Identity (IMSI), but is addressable by the same public identification of the single user subscriber;

transmitting a second session initiation request to establish a communication link towards the first user entity, the second session initiation request comprising the first user identification;

determining a first current communication state of the first user entity and a second communication state of a second user entity of the set of user entities, each communication state being one of a busy state, an idle state and a non-available state;

transmitting the second session initiation request towards the first user entity if the first communication state indicates that the first user entity is in the busy state and towards the first user entity and a second user entity of the set of user entities by a parallel ringing if the first and second communication states indicate that the first and second user entities are in the idle state, and wherein the first user entity accepting the second session initiation causes the second session initiation request towards the second user entity to be terminated;

receiving two user identifications for each user entity, wherein a first user identification of the two user identifications comprises a Globally Routable User Agent Uniform Resource Identifier (GRUU) and a second user identification of the two user identifications comprises an IMSI;

performing a third-party registration with a network control entity, wherein the third-party registration comprises an exchange of the following registration messages with the network control entity:

receiving a first message from the network control entity to register an IMS Public User Identification (IMPU) of the first user entity, wherein the first message comprises the MSISDN of the first user entity, wherein the IMPU of the first user entity is known by the network control entity from a previous IMS registration procedure with the first user entity;

responding with an acknowledgement to the first message;

transmitting a second message to the network control entity, wherein the second message comprises a subscription to a registration event package;

receiving an acknowledgement to the second message;

receiving a SIP Notify message from the network control entity, wherein the SIP Notify message notifies the IMPU and a GRUU associated with the first user entity, wherein the GRUU of the first user entity is emulated by the network control entity on behalf of the first user entity;

responding with an acknowledgement to the SIP Notify message;

receiving a second SIP Notify message from the network control entity, wherein the second SIP Notify message notifies an IMPU and a GRUU associated with the second user entity, wherein the IMPU of the second user entity is known by the network control entity from a previous IMS registration procedure with the second user entity and wherein the GRUU of the second user entity is emulated by the network control entity on behalf of the second user entity; and responding with an acknowledgement to the second SIP Notify message.

19. The application server of claim 13, configured to decide, based on the stored at least one user identification, whether to establish parallel communication links towards the user entities or whether to selectively route towards a dedicated user entity in dependence on the communication state.

* * * * *